United States Patent
Muralidharan et al.

(10) Patent No.: US 10,731,016 B2
(45) Date of Patent: Aug. 4, 2020

(54) METHOD OF MODIFYING THE DISPENSING PROPERTIES OF A CONTAINER

(71) Applicant: Conopco, Inc., Englewood Cliffs, NJ (US)

(72) Inventors: Girish Muralidharan, Bangalore (IN); Amitava Pramanik, Bangalore (IN); Sumana Roychowdhury, Bangalore (IN)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 16/318,666

(22) PCT Filed: Jun. 22, 2017

(86) PCT No.: PCT/EP2017/065439
§ 371 (c)(1),
(2) Date: Jan. 17, 2019

(87) PCT Pub. No.: WO2018/015099
PCT Pub. Date: Jan. 25, 2018

(65) Prior Publication Data
US 2019/0276622 A1 Sep. 12, 2019

(30) Foreign Application Priority Data

Jul. 18, 2016 (EP) .................... 16179875

(51) Int. Cl.
| | | |
|---|---|---|
| *C08J 7/18* | (2006.01) | |
| *B65D 1/02* | (2006.01) | |
| *B65D 23/02* | (2006.01) | |
| *B65D 65/42* | (2006.01) | |
| *C08J 7/06* | (2006.01) | |
| *C09D 4/00* | (2006.01) | |
| *C09D 133/24* | (2006.01) | |
| *B65B 61/00* | (2006.01) | |
| *B32B 27/16* | (2006.01) | |
| *C08J 7/12* | (2006.01) | |
| *B32B 27/18* | (2006.01) | |
| *C08K 5/20* | (2006.01) | |

(52) U.S. Cl.
CPC .............. *C08J 7/18* (2013.01); *B32B 27/16* (2013.01); *B32B 27/18* (2013.01); *B65B 61/00* (2013.01); *B65D 1/0207* (2013.01); *B65D 1/0215* (2013.01); *B65D 23/02* (2013.01); *B65D 65/42* (2013.01); *C08J 7/06* (2013.01); *C08J 7/12* (2013.01); *C08J 7/123* (2013.01); *C08K 5/20* (2013.01); *C09D 4/00* (2013.01); *C09D 133/24* (2013.01); *C08J 2323/06* (2013.01); *C08J 2433/24* (2013.01)

(58) Field of Classification Search
CPC ....... C08J 7/18; C08J 7/06; C08J 7/123; C08J 7/12; C08J 2323/06; C08J 2433/24; B65D 1/0215; B65D 23/02; B65D 65/42; B65D 1/0207; C09D 4/00; C09D 133/24; C08K 5/20; B65B 61/00; B32B 27/16; B32B 27/18
See application file for complete search history.

(56) References Cited

U.S. PATENT DOCUMENTS

| | | |
|---|---|---|
| 3,598,634 A | 8/1971 | Kraft |
| 4,344,981 A | 8/1982 | Imada et al. |
| 4,764,405 A | 8/1988 | Bauman et al. |
| 5,041,304 A | 8/1991 | Kusano et al. |
| 6,515,056 B2 | 2/2003 | Treutlein |
| 6,926,951 B2 | 8/2005 | Huffer et al. |
| 8,021,760 B2 | 9/2011 | McAllister, Jr. et al. |
| 8,822,035 B1 | 9/2014 | Hammen et al. |
| 9,029,447 B2 | 5/2015 | Martinelli et al. |
| 2002/0164443 A1 | 11/2002 | Oles et al. |
| 2004/0071906 A1 | 4/2004 | Brewis et al. |
| 2007/0020472 A1 | 1/2007 | Mills et al. |
| 2007/0087131 A1 | 4/2007 | Hutchinson et al. |
| 2010/0075077 A1 | 3/2010 | Bicker et al. |
| 2012/0306126 A1 | 12/2012 | Fuss et al. |
| 2013/0142975 A1 | 6/2013 | Wallace |
| 2013/0251769 A1 | 9/2013 | Smith et al. |

(Continued)

FOREIGN PATENT DOCUMENTS

| | | |
|---|---|---|
| CN | 102029253 | 4/2011 |
| EP | 0906356 | 11/2004 |

(Continued)

OTHER PUBLICATIONS

Search Report and Written Opinion in PCTEP2017065439; dated Sep. 20, 2017

(Continued)

*Primary Examiner* — Michael C Miggins
(74) *Attorney, Agent, or Firm* — Foley & Lardner LLP

(57) ABSTRACT

A method of modifying the dispensing properties of a container, said method comprising the following steps: •providing a container comprising a container wall having an inner surface and a dispensing opening, said inner surface being composed of hydrophobic polymer; •subjecting the inner surface of the container to an oxidative surface treatment; •applying a coating layer onto the inner surface of the container by coating said inner surface with a coating solution containing amide slip agent selected from optionally fluorinated fatty acid amide, polysiloxane amide and combinations thereof; and •removing the solvent in the coating layer by evaporation.

15 Claims, No Drawings

(56) References Cited

U.S. PATENT DOCUMENTS

| | | |
|---|---|---|
| 2014/0147627 A1 | 5/2014 | Aizenberg et al. |
| 2014/0290732 A1 | 10/2014 | Aizenberg et al. |
| 2014/0319004 A1 | 10/2014 | Hawighorst et al. |
| 2014/0332437 A1 | 11/2014 | Lee et al. |
| 2015/0083759 A1 | 3/2015 | Medeiros et al. |
| 2016/0039557 A1 | 2/2016 | Akutsu et al. |

FOREIGN PATENT DOCUMENTS

| | | |
|---|---|---|
| EP | 2123571 | 11/2009 |
| GB | 792009 | 3/1958 |
| JP | 2006272756 | 2/2006 |
| WO | WO9221719 | 12/1992 |
| WO | WO03066512 | 8/2003 |
| WO | WO2008080577 | 7/2008 |
| WO | WO2013106588 | 7/2013 |
| WO | WO2013190182 | 12/2013 |
| WO | WO2014012039 | 1/2014 |

OTHER PUBLICATIONS

EP Patent Office; Search Report and Written Opinion in EP16179875.6; Search Report and Written Opinion in EP16179875.6; dated Jan. 19, 2017; 7 pages.

METHOD OF MODIFYING THE DISPENSING PROPERTIES OF A CONTAINER

CROSS REFERENCE TO RELATED APPLICATIONS

The present application is a U.S. National Phase Application under 35 U.S.C. § 371 of International Application No. PCT/EP2017/065439, filed on Jun. 22, 2017, which claims priority to European patent application No. 16179875.6 filed on Jul. 18, 2016, the contents of which are incorporated by reference herein in their entireties.

TECHNICAL FIELD OF THE INVENTION

The present invention relates to a method of modifying the dispensing properties of a container. More particularly, the invention provides a method comprising the following steps:
 providing a container comprising a container wall having an inner surface and a dispensing opening, said inner surface being composed of hydrophobic polymer;
 subjecting the inner surface of the container to an oxidative surface treatment;
 applying a coating layer onto the inner surface of the container by coating said inner surface with a coating solution containing amide slip agent selected from optionally fluorinated fatty acid amide, polysiloxane amide and combinations thereof; and
 removing the solvent in the coating layer by evaporation.

The present method yields a container from which fluid products can dispensed easily and without leaving much product inside the container, sticking to the inner surface.

BACKGROUND OF THE INVENTION

Plastics are widely used in the manufacture of containers. These plastic containers generally have chemically inert nonporous surfaces with low surface energy. This makes them non-receptive to bonding with inks, adhesives, coatings, and other substrates.

The surface energy of a solid varies with its chemical make-up. Metals and glass have a high surface energy and are easier to bond; whereas plastics have a lower surface energy and are harder to bond. The following table shows the surface energies of a number of metals and polymers.

| Material | Surface free energy at 20° C. (in mJ/m$^2$) |
| --- | --- |
| Aluminium | 840 |
| Copper | 1100 |
| Polyethylene-linear | 35.7 |
| Polypropylene-isotactic | 30.1 |
| Polystyrene | 40.7 |
| Polyvinylchloride | 41.5 |
| Polymethylmethacrylate | 41.1 |
| Polyethyleneterephthalate | 44.6 |
| Polycarbonate | 34.2 |

It is known in the art to increase the surface energy of low surface energy materials by applying surface modification techniques which can change the chemical composition of the surface to increase the surface energy. These techniques include UV/ozone, flame, corona or plasma treatment and chemical oxidation.

Plastic containers are widely used in a variety of applications. Squeezable plastic containers are often used to package viscous slurry-like or paste-like fluids, such as ketchup, shampoo etc. Often, containers holding highly viscous fluid contents are stored in an inverted position (top-down) to quickly discharge the contents and to minimize the amount of product that remains in the container once it has been emptied. Nonetheless, it is generally difficult to quickly dispense viscous fluids from plastic containers and often a substantial amount of product remains stuck to the inside of the container once the container has been emptied.

It is known to improve the dispensing properties of plastic containers by applying a suitable internal coating.

US 2016/0039557 describes a blow-formed container having a liquid layer formed in an amount of not more than 10 g/m$^2$ on the whole inner surface of the stretched portion thereof. An oleophilic liquid is used for aqueous content, and water or a hydrophilic liquid is used for the oily content. Silicone oil, fatty acid ester of glycerin, fluid paraffin, and edible fat and oil are mentioned as examples of oleophilic liquids that may be used.

It is also known to improve the dispensing properties of plastic containers by adding slip-improving components to the polymer resins from which containers are formed. US 2010/092621 describes a multi-layer plastic container for a non-oily content having at least a polyolefin resin layer on an inner surface thereof and for being filled with the non-oily content, wherein the polyolefin resin layer on the inner surface of the container contains an aliphatic amide in an amount of not less than 500 ppm but less than 4000 ppm.

US 2014/0332437 describes a manufacturing method of a food container having oxygen barrier properties, the method comprising the steps of:
 preparing a container made of a plastic material;
 performing an oxygen plasma treatment on a surface of the container;
 depositing a buffer thin layer having a thickness of 5 to 30 nm on the surface of the container; and
 depositing an oxygen barrier thin layer on the buffer thin layer.

The buffer thin layer may be formed of hexamethyldisiloxane (HMDSO) or silicon (Si).

The oxygen barrier thin layer may be formed of silicon oxide.

US2010092621A (Toyo Seikan Kaisha Ltd) discloses a polyethylene container which enables a non-oily viscous content such as ketchup to favorably run down when the container is inverted. The solution lies in at least one polyethylene resin layer on the inner surface containing an aliphatic amide not less than 500 ppm but less than 4000 ppm.

SUMMARY OF THE INVENTION

The inventors have discovered that the dispensing properties of containers made of hydrophobic polymer can be improved substantially by first subjecting the inner surface of the container to an oxidative surface treatment, followed by coating the pre-treated inner surface with a coating solution that contains an amide slip agent selected from optionally fluorinated, fatty acid amide, polysiloxane amide and combinations thereof; and removing the solvent in the coating layer by evaporation.

Although the inventors do not wish to be bound by theory, it is believed that the oxidative surface treatment results in the formation of oxygen containing residues on the inner surface of the container, and that these oxygen containing residues can form a bond with the amide slipping agent.

The present method offers the important advantage that only very limited quantities of amide slipping agent are required to greatly improve the dispensing properties of containers made of hydrophobic polymers. Furthermore, due to the fact that the amide slipping agent is strongly bound to the inside of the container, virtually no amide slipping agent is absorbed into the product that is held within the container.

The invention also relates to a container that is obtained by the aforementioned method.

DETAILED DESCRIPTION OF THE INVENTION

A first aspect of the present invention relates to a method of modifying the dispensing properties of a container, said method comprises the following steps:
- providing a container comprising a container wall having an inner surface and a dispensing opening, said inner surface being composed of hydrophobic polymer, said inner surface having a surface free energy at 20° C. of less than 70 mJ/m$^2$;
- subjecting the inner surface of the container to an oxidative surface treatment to produce a pre-treated inner surface;
- applying a coating layer onto the pre-treated inner surface by coating said pre-treated inner surface with a coating solution, said coating solution comprising a solvent and 0.05-20 wt. % of amide slip agent selected from optionally fluorinated fatty acid amide, polysiloxane amide and combinations thereof; and
- removing the solvent in the coating layer by evaporation.

The term "container" as used herein refers to a device creating a partially or fully enclosed space that can be used to contain, store, and transport fluid materials.

The term "solvent" as used herein refers to a fluid material in which the amide slipping agent or agents is/are dissolved or dispersed. The term solvent also includes liquefied gas and supercritical fluids.

Examples of containers that may suitably be treated in the present method include bottles and sachets. Most preferably, the container in the present method is a bottle.

The pre-treated inner surface of the container typically represents a surface area of 5-1,000 cm$^2$, more preferably of 25-500 cm$^2$.

Typically, the inner volume of the container is typically in the range of 3-5000 ml, more preferably in the range of 100-1000 ml.

The inner surface of the present container is composed of hydrophobic polymer. The hydrophobic polymer may be applied as a coating onto a container wall that is made of another material, e.g. preferably, the container wall is made of hydrophobic polymer.

The hydrophobic polymer that is present on the inner surface of the container is preferably selected from acrylonitrile butadiene styrene (ABS), acrylonitrile styrene acrylate (ASA), ethylene propylene diene monomer (EPDM) rubber, polycarbonate (PC), polyethylene (PE), polyethyleneterephthalate (PET), poly(ethylene-vinyl acetate) (PEVA), polymethylmethacrylate (PMMA), polypropylene (PP), polystyrene (PS), polyurethane (PU), polyvinylchloride (PVC), polybutylene terephthalate (PBT) and mixtures thereof. More preferably, the hydrophobic polymer is selected from PE, PET, PP and mixtures thereof.

Prior to the oxidative surface treatment, the inner surface of the container preferably has a surface free energy at 20° C. of less than 60 mJ/m$^2$, more preferably of less than 45 mJ/m$^2$ and most preferably of less than 30 mJ/m$^2$.

The oxidative surface treatment employed in the present method is preferably selected from UV/ozone treatment, plasma glow discharge, corona discharge, flame treatment, chemical oxidation and combinations thereof. More preferably, the oxidative surface treatment is selected from UV/ozone treatment, plasma glow discharge and combinations thereof. Most preferably, the oxidative surface treatment comprises UV/ozone treatment.

In accordance with a particularly preferred embodiment, the oxidative surface treatment increases the surface free energy of the inner surface at 20° C. with at least 5 mJ/m$^2$, more preferably with at least 10 mJ/m$^2$.

Typically, the oxidative surface treatment increases the surface free energy of the inner surface at 20° C. to at least 40 mJ/m$^2$, more preferably to at least 45 mJ/m$^2$.

According to a particularly preferred embodiment, the oxidative surface treatment is carried out during the blow molding process in which the container is formed, especially during the blowing step in which the container shaped.

The coating solution employed in the present method preferably contains at least 0.5 wt. %, more preferably at least 1 wt. % and most preferably 1-10 wt. % of the amide slip agent.

The pre-treated inner surface is preferably coated with the coating solution at atmospheric pressure or at elevated pressure. Application of the coating solution at elevated pressure can be advantageous if the solvent of the coating liquid is a liquefied gas or a supercritical fluid.

The pre-treated surface is preferably coated at a temperature in the range of 10-90° C., more preferably in the range of 20-80° C., most preferably in the range of 30-60° C.

The coating layer of coating solution can suitably be applied onto the pre-treated inner surface of the container in a variety of ways. Preferably, the coating layer is applied by spraying the coating solution onto the pre-treated inner surface.

The coating solution employed in the present method typically has a surface tension of at least 15 mJ/m$^2$. More preferably, the coating solution has a surface tension in the range of 20-40 mJ/m$^2$ and most preferably in the range of 22-30 mJ/m$^2$.

The amide slip agent used in the present method preferably has a melting point of at least 50° C., more preferably in the range of 50-150° C.

The fatty acid amide preferably is a $C_{8-22}$ fatty acid amide, more preferably a $C_{12-22}$ fatty acid amide.

Preferably, the amide slip agent is an optionally fluorinated fatty acid amide, more preferably a non-fluorinated fatty acid amide.

In another embodiment the back bone of the fatty acid amide employed in the present method may preferably be fluorinated.

In the present method the amide slip agent is preferably applied onto the pre-treated inner surface in an amount of 0.01-25 g/m$^2$, more preferably in an amount of 0.1-10 g/m$^2$ and most preferably in an amount of 2-6 g/m$^2$.

The coating solution that is used to apply the coating layer onto the pre-treated inner surface typically contains at least 50 wt. %, more preferably at least 70 wt. % of solvent having a boiling point below 120° C., more preferably below 100° C., most preferably below 80° C.

Preferably, the solvent in the coating solution is a liquid or a liquefied gas. Most preferably, the solvent is a liquid. According to a particularly preferred embodiment, the solvent in the coating solution is selected from ethanol, n-propanol, iso-propanol and combinations thereof.

After application of the layer of coating solution, the solvent in the coating layer can be removed by evaporation at atmospheric pressure or reduced pressure. Preferably, the solvent is removed by evaporation at atmospheric pressure.

In order to aid the evaporation of the solvent it is preferred to carry out solvent evaporation at elevated temperature, e.g. at a temperature of at least 40° C., more preferably at a temperature of at least 60° C. and most preferably at a temperature of 60-80° C.

Another aspect of the invention relates to a container with modified dispensing properties that can be obtained, or preferably that is obtained by a method as described herein.

Yet another aspect of the invention relates to a packaged fluid product comprising the container according to the present invention and a fluid product that is held within said container. According to a particularly preferred embodiment, the fluid product is an aqueous fluid product, preferably an aqueous fluid product that is water-continuous and that contains at least 50 wt. % water. Examples of aqueous fluid products that can suitably be packaged in the present container include viscous food products like ketchup, mayonnaise, shampoos, liquid soaps, liquid detergents and skin care formulations.

The advantageous properties of the present container are particularly appreciated in case the container is used to package relatively viscous and low surface tension fluid products. Accordingly, in a preferred embodiment, the fluid product has a viscosity of at least 1 mPa·s at 20° C. and 1 s$^{-1}$. More preferably, the fluid product has a viscosity of at least 100 mPa·s at 20° C., most preferably of 500 mPa·s at 1 s$^{-1}$. The viscosity of the fluid product can suitably be determined using a Brookefield viscometer.

The invention is further illustrated by the following non-limiting examples.

EXAMPLES

Example 1

Surface Treatment

The surface of sample 1, a plastic surface (4×4 cm) made of high density polyethylene (HDPE), was treated with an oxygen flow of 0.1 bar pressure and UV light (~28-32 mW/cm$^2$ at 253.7 nm) for 30 minutes using an UVO cleaner (Jelight UVO 342-220). The water contact angle and surface energy was measured for both sample 1 and sample A, which is a HDPE plastic surface (4×4 cm) that did not receive the UV/ozone treatment. The results of these measurements are displayed in Table 1.

The water contact angle was measured by placing a 5 μL droplet of water on the surface of a sample and holding the sample horizontally and capturing the images for contact angle determination. The contact angle was estimated using ImageJ© software through the help of a DropSnake plug-in. For the surface energy calculation, the contact angle of another liquid diiodomethane was measured on the sample surface. By using a standard OWRK model, the surface energy of the samples was estimated.

TABLE 1

| Sample | Treatment | Water contact angle (°) | Surface energy (mJ/m$^2$) |
|---|---|---|---|
| A | None | 82.7 | 33 |
| 1 | UV/ozone | 69.6 | 41 |

Coating of the Surface

Docosenamide was dissolved at 2 wt. % in isopropanol by stirring the mixture at a temperature of about 40° C. Docosenamide dissolved irreversibly, i.e. after cooling to room temperature of the solution, there was no re-precipitation.

Of the above docosenamide solution 0.5 ml was spray coated onto the treated and untreated surface of example 1 and A respectively. The spray coated surfaces were incubated at room temperature for 30 minutes to obtain complete evaporation of the solvent. The surface properties after coating is displayed in Table 2.

TABLE 2

| Sample | Water contact angle (°) | Surface energy (mJ/m$^2$) |
|---|---|---|
| A | 105.3 | 24.3 |
| 1 | 97.5 | 25.9 |

This data shows that the surface energy values for both samples is similar, after coating with the slip agent. However, visually a non-uniform coating was observed on the surface of sample A.

Example 2

Surface Treatment

A HDPE plastic surface (12×5 cm) was treated with ozone and UV light, as described herein before in example 1, to obtain sample 2. Sample B was a HDPE plastic surface (12×5 cm) that remained untreated.

Coating of the Surface

Erucamide was dissolved at 2 wt. % in isopropanol by stirring the mixture at a temperature of 40° C. The erucamide dissolved irreversibly.

Of the above erucamide solution 1.5 ml was spray coated onto the treated and untreated surface of sample 2 and B respectively. The spray coated surfaces were incubated at 80° C. for a couple of minutes to obtain complete evaporation of the solvent.

Dispensation Rate of Viscous and Low Surface Tension Liquids

The dispensation rates of two liquids were tested on the surfaces of sample 2 and B. Glycerol (Sigma) with a surface tension of about 63.4 mJ/m$^2$ and Sylgard 184 (Dow Corning) with a viscosity of 5100 mPa·s were tested.

For each liquid and each sample surface the following was tested in 3-fold. 100 μl of a liquid was pipetted on the surface of a sample as a drop. The time taken for the drop of liquid to travel 10 cm was measured. The results for these measurement are displayed in Table 3.

TABLE 3

| | Time (s) | |
|---|---|---|
| Sample | Glycerol | Silicone |
| B | 13.2 ± 0.6 | 220 ± 56 |
| 2 | 9.5 ± 0.2 | 94.5 ± 29 |

With the inclusion of a pre-surface treatment step, the dispensation rate of the liquids is increased. This is attributed to the superior uniformity of the slip agent coating on the surface and also to the better adhesion of the slip agent onto the surface due to the surface pre-treatment.

The invention claimed is:

1. A method of modifying the dispensing properties of a container, said method comprising the following steps:

providing a container comprising a container wall having an inner surface and a dispensing opening, said inner surface being composed of hydrophobic polymer, said inner surface having a surface free energy at 20° C. of less than 70 mJ/m$^2$;

subjecting the inner surface of the container to an oxidative surface treatment to produce a pre-treated inner surface;

applying a coating layer onto the pre-treated inner surface by coating said pre-treated inner surface with a coating solution, said coating solution comprising a solvent and 0.05-20 wt. % of amide slip agent selected from optionally fluorinated fatty acid amide, polysiloxane amide and combinations thereof; and removing the solvent in the coating layer by evaporation.

2. The method according to claim 1, wherein the hydrophobic polymer is selected from acrylonitrile butadiene styrene (ABS), acrylonitrile styrene acrylate (ASA), ethylene propylene diene monomer (EPDM) rubber, polycarbonate (PC), polyethylene (PE), polyethyleneterephthalate (PET), poly(ethylene-vinyl acetate) (PEVA), polymethylmethacrylate (PMMA), polypropylene (PP), polystyrene (PS), polyurethane (PU), polyvinylchloride (PVC), polybutylene terephthalate (PBT), and a mixture of any two or more thereof.

3. The method according to claim 1, wherein the hydrophobic polymer is selected from PE, PET, PP, and a mixture of any two or more thereof.

4. The method according to claim 1, wherein the oxidative surface treatment increases the surface free energy of the inner surface at 20° C. with at least 5 mJ/m$^2$.

5. The method according to claim 1, wherein the oxidative surface treatment increases the surface free energy of the inner surface at 20° C. to at least 40 mJ/m$^2$.

6. The method according to claim 1, wherein the coating layer is applied by spraying the coating solution onto the pre-treated inner surface.

7. The method according to claim 1, wherein the container is formed by blow molding and the oxidative surface treatment is carried out during said blow molding.

8. The method according to claim 1, wherein the coating solution has a surface tension of at least 15 mJ/m$^2$.

9. The method according to claim 1, wherein the amide slip agent has a melting point of at least 50° C.

10. The method according to claim 1, wherein the coating solution contains at least 50 wt. % of a solvent selected from ethanol, n-propanol, iso-propanol, and a combination of any two or more thereof.

11. The method according to claim 1, wherein the amide slip agent is applied onto the pre-treated inner surface in an amount of 0.01-25 g/m$^2$.

12. The method according to claim 1, wherein the oxidative surface treatment increases the surface free energy of the inner surface at 20° C. with at least 10 mJ/m$^2$.

13. The method according to claim 1, wherein the oxidative surface treatment increases the surface free energy of the inner surface at 20° C. to at least 45 mJ/m$^2$.

14. The method according to claim 1, wherein the oxidative surface treatment is selected from UV/ozone treatment, plasma glow discharge, corona discharge, flame treatment, chemical oxidation, and a combination of any two or more thereof.

15. The method according to claim 14, wherein the oxidative surface treatment comprises UV/ozone treatment.

* * * * *